(12) United States Patent
Zhou et al.

(10) Patent No.: US 11,229,072 B2
(45) Date of Patent: Jan. 18, 2022

(54) USER EQUIPMENT CAPABLE OF ATTACHING TO MULTIPLE COMMUNICATION NETWORKS

(71) Applicant: Huawei Technologies Duesseldorf GmbH, Duesseldorf (DE)

(72) Inventors: Chan Zhou, Munich (DE); Alexandros Kaloxylos, Munich (DE); Panagiotis Spapis, Munich (DE); Chenghui Peng, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 19 days.

(21) Appl. No.: 16/552,643

(22) Filed: Aug. 27, 2019

(65) Prior Publication Data
US 2019/0387559 A1 Dec. 19, 2019

Related U.S. Application Data

(63) Continuation of application No. PCT/EP2017/054431, filed on Feb. 27, 2017.

(51) Int. Cl.
*H04W 76/14* (2018.01)
*H04W 16/10* (2009.01)
*H04W 68/12* (2009.01)
*H04W 72/04* (2009.01)
*H04W 72/12* (2009.01)

(52) U.S. Cl.
CPC ........... *H04W 76/14* (2018.02); *H04W 16/10* (2013.01); *H04W 68/12* (2013.01); *H04W 72/0413* (2013.01); *H04W 72/1215* (2013.01)

(58) Field of Classification Search
None
See application file for complete search history.

(56) References Cited

U.S. PATENT DOCUMENTS

| | | | |
|---|---|---|---|
| 8,538,430 B1 * | 9/2013 | Filiatrault | H04W 36/0016 455/436 |
| 9,198,210 B2 | 11/2015 | Phan et al. | |
| 9,426,642 B1 * | 8/2016 | Sridhar | H04W 8/06 |
| 9,750,058 B2 | 8/2017 | Gruet et al. | |
| 2004/0053632 A1 * | 3/2004 | Nikkelen | H04W 36/0066 455/522 |
| 2005/0281216 A1 * | 12/2005 | Varonen | H04W 8/20 370/328 |
| 2010/0128696 A1 * | 5/2010 | Fantini | H04L 29/12028 370/331 |
| 2011/0028120 A1 * | 2/2011 | Wu | H04W 36/0022 455/404.1 |
| 2011/0258327 A1 | 10/2011 | Phan et al. | |

(Continued)

*Primary Examiner* — Khaled M Kassim
(74) *Attorney, Agent, or Firm* — Leydig, Voit & Mayer, Ltd.

(57) ABSTRACT

A user equipment is configured to be connected to a first cellular communication network and a second cellular communication network. The user equipment comprises: a communication interface configured to transmit a first message to the second communication network, when the user equipment is connected to the first communication network and is triggered to connect additionally to the second communication network, wherein the first message comprises information about the first communication network.

14 Claims, 8 Drawing Sheets

(56) References Cited

U.S. PATENT DOCUMENTS

| | | | |
|---|---|---|---|
| 2014/0269512 A1* | 9/2014 | Koo | H04W 48/18 |
| | | | 370/328 |
| 2015/0163789 A1 | 6/2015 | Vasudevan et al. | |
| 2015/0171944 A1 | 6/2015 | Kalhan | |
| 2015/0341972 A1 | 11/2015 | Gruet et al. | |
| 2016/0073298 A1 | 3/2016 | Brahmi et al. | |
| 2017/0070877 A1* | 3/2017 | Shi | H04W 4/12 |
| 2017/0127217 A1* | 5/2017 | Miao | H04W 4/60 |
| 2017/0187479 A1* | 6/2017 | Yamamoto | H04M 11/025 |
| 2019/0364492 A1* | 11/2019 | Azizi | H04W 52/0264 |
| 2020/0196232 A1* | 6/2020 | Drevo | H04W 76/27 |

* cited by examiner

USER EQUIPMENT CAPABLE OF ATTACHING TO MULTIPLE COMMUNICATION NETWORKS

CROSS-REFERENCE TO RELATED APPLICATIONS

This application is a continuation of International Application No. PCT/EP2017/054431, filed on Feb. 27, 2017, the disclosure of which is hereby incorporated by reference in its entirety.

TECHNICAL FIELD

Generally, the present invention relates to the field of wireless communication. More specifically, the present invention relates to a user equipment and a network entity for a wireless communication network.

BACKGROUND

In response to a power-on, a user equipment (UE) (also referred to as mobile device or end device) will generally search and attach to the wireless communication network (also referred to as a mobile or cellular network) of the mobile network operator the user equipment has subscribed to (this network is also referred to as home public land mobile network ("HPLMN")). In case the user equipment is at a location where the HPLMN is not available (for instance, when the user equipment is abroad), the user equipment will perform a roaming procedure and attach to a visiting public land mobile network (VPLMN). Thus, generally a user equipment having only a single radiofrequency (RF) chain or a single instance of higher layer control protocols, such as RRC (Radio Resource and Control), is not capable of attaching to more than one mobile network at the same time. A conventional user equipment that needs to manage its connectivity states (e.g., IDLE, CONNECTED) for more than one mobile network will face a number of issues, such as the appropriate allocation of the communication resources of the user equipment and the different mobile networks, different parameterization of mobile network timers, and the like.

Dual-SIM user equipments, which are capable of attaching to two different mobile networks, are known. Dual-SIM user equipments, however, do not allow managing the connectivity to more than two networks at the same time, which would be desirable, for instance, in a vehicle-to-everything (V2X) environment, i.e. a mobile wireless communication environment comprising vehicles and infrastructure.

Further suggested approaches, like pre-registering to multiple mobile networks, can minimize the switching time from one mobile network operator to another. However, how to efficiently manage the connection to more than one mobile network operator, for instance, when crossing the border between geographical areas still remains a problem.

U.S. Pat. No. 9,198,210 discloses an approach based on a database of registration information associating UEs with cells under control of different network operators. The registration information is used to coordinate between a first network operator and a second network operator to facilitate establishment of a direct communication link between the first UE and the second UE.

Some approaches have been suggests about how to select a specific public land mobile network (PLMN) when roaming. Usually, this involves the pre-configuration of the subscriber identity module (SIM) card of the UE with a prioritized list of PLMNs to be used when the US needs to perform roaming. U.S. Pat. No. 8,611,280 discloses a method for selecting from a prioritized list of PLMNs as well the most suitable access technology to be used. These kinds of solutions are not suitable for dynamic environments of moving devices that require multi connectivity and focus only on single operator aspects.

Thus, current technical approaches are not capable of tackling the problem of supporting user equipments in a manner which allows managing their connectivity to multiple mobile networks. Therefore, there is a need for improved user equipments and network entities as well as corresponding methods allowing user equipments to attach to more than one mobile network.

SUMMARY

It is an object of the invention to provide improved user equipments and network entities as well as corresponding methods allowing user equipments to attach to more than one mobile network.

According to a first aspect, the invention relates to a user equipment configured to be connected to a first cellular communication network and additionally to a second cellular communication network, wherein the user equipment comprises: a communication interface configured to transmit a first message to the second cellular communication network, when the user equipment is connected to the first cellular communication network and is triggered to connect additionally to the second cellular communication network, wherein the first message comprises information about the first cellular communication network. The first and second cellular communication networks can be physically or logically independent networks.

Thus, an improved user equipment is provided, which is capable of attaching to more than one mobile network. Embodiments of the invention support the ability of user equipments to have multiple connectivity options with different (logical or physical) networks even if a UE has only one RF chain or a single instance of higher layer control protocols, e.g., RRC in Long-Term Evolution (LTE). This may be of particular advantage in use cases like V2X communication, where the UE often receives information from more than one operator, or network slicing, where the UE has to simultaneously connect to more than one slice.

In a first possible implementation form of the user equipment according to the first aspect as such, the communication interface is configured to transmit a second message to the second communication network, when the user equipment is connected to the first communication network and the second communication network, wherein the second message comprises information about the first communication network.

In a second possible implementation form of the user equipment according to the first aspect as such or the first implementation form thereof, the first message and/or the second message further comprises information about the allocation of a plurality of communication resources to the user equipment by the first communication network. In an implementation form the communication resources can be time-frequency communication resources. In an implementation form the communication resources can be resource blocks of a resource grid.

In a third possible implementation form of the user equipment according to the first aspect as such or the first or second implementation form thereof, the first message is a "Connection Request" message and the communication interface is configured to transmit the "Connection Request" to the second cellular communication network, when the user equipment is being triggered to connect additionally to the second cellular communication network.

In a fourth possible implementation form of the user equipment according to the first aspect as such or any one of the first to third implementation form thereof, the user equipment further comprises a processor being configured to be in one of a plurality of states, including a first state and a second state, wherein in the first state of the processor the user equipment is connected to the first cellular communication network but not to the second cellular communication network and wherein in the second state of the processor the user equipment is connected to the first cellular communication network and the second cellular communication network.

In a fifth possible implementation form of the user equipment according to the fourth implementation form of the first aspect, the communication interface is configured to transmit the second message intermittently, in particular periodically, to the second cellular communication network, when being in the second state of the processor.

In a sixth possible implementation form of the user equipment according to the fourth implementation form of the first aspect, the processor is further configured to provide a counter for determining the number of cellular communication networks the user equipment is connected to, wherein the first state of the processor is a "Connected" state with a first value of the counter and the second state of the processor is the "Connected" state with a second value of the counter.

In a seventh possible implementation form of the user equipment according to the fourth implementation form of the first aspect, the first state of the processor is a "Connected" state and the second state of the processor is a "Multi-Connected" state.

In an eighth possible implementation form of the user equipment according to the fourth implementation form of the first aspect, the processor is configured to implement a plurality of instances of a state diagram, including a "Connected" state, wherein the first state of the processor corresponds to the "Connected" state of a single instance of the state diagram and wherein the second state of the processor corresponds to the "Connected" states of two instances of the state diagram.

In a ninth possible implementation form of the user equipment according to any one of the fourth to eighth implementation form of the first aspect, the processor is further configured to provide a timing function, wherein in the second state of the processor the timing function is configured to temporally align, e.g. synchronize, the first and the second cellular communication networks.

In a tenth possible implementation form of the user equipment according to any one of the fourth to ninth implementation form of the first aspect, a transition between the first state and the second state of the processor is triggered by one or more of the following events: incoming or outgoing data traffic; inactivity of the user equipment; activation, sensing, notification and/or identification of the second cellular communication network; change of the geographical position of the user equipment; receiving a reconfiguration message; and/or receiving a message related to a location tracking of the user equipment.

In an eleventh possible implementation form of the user equipment according to the first aspect as such or any one of the first to tenth implementation form thereof, the user equipment is configured, when the user equipment is not connected to the first communication network, by a first configuration to access a broadcast channel of the first cellular communication network and, when the user equipment is not connected to the second cellular communication network, by a second configuration to access a broadcast channel of the second cellular communication network.

According to a second aspect the invention relates to a method of operating a user equipment configured to be connected to a first cellular communication network and a second cellular communication network, wherein the method comprises the steps of: transmitting a first message to the second cellular communication network, when the user equipment is triggered to connect additionally to the second cellular communication network, wherein the first message comprises information about the first cellular communication network.

According to a third aspect the invention relates to a network entity, in particular a management server, of a cellular communication network configured to allow a user equipment to communicate over the cellular communication network on the basis of a plurality of communication resources, in particular resource blocks, allocated to the user equipment by the cellular communication network, wherein the network entity comprises: a communication interface configured to receive a message from the user equipment, wherein the message comprises information about a further cellular communication network the user equipment is connected to; and a processor configured to allocate at least one of the plurality of communication resources to the user equipment for communicating over the cellular communication network on the basis of the information about the further cellular communication network the user equipment is connected to.

In a first possible implementation form of the network entity according to the third aspect as such, the message further comprises information about the allocation of the plurality of communication resources to the user equipment by the further communication network.

In a second possible implementation form of the network entity according to the third aspect as such or the first implementation form thereof, the message is a "Connection Request" message.

In a third possible implementation form of the network entity according to the third aspect as such or the first implementation form thereof, when the user equipment is connected to the cellular communication network, the processor is configured to dynamically allocate the at least one of the plurality of communication resources to the user equipment for communicating over the cellular communication network, in response to intermittently receiving the message from the user equipment.

According to a fourth aspect the invention relates to a method of operating a network entity of a cellular communication network configured to allow a user equipment to communicate over the cellular communication network on the basis of a plurality of communication resources, in particular resource blocks, allocated to the user equipment by the cellular communication network, wherein the method comprises the steps of: receiving a message from the user equipment, wherein the message comprises information about a further cellular communication network the user equipment is connected to; and allocating at least one of the plurality of communication resources to the user equipment for communicating over the cellular communication network on the basis of the information about the further cellular communication network the user equipment is connected to.

According to a fifth aspect the invention relates to a computer program comprising program code for performing the method according to the second aspect or the method according to the fourth aspect, when executed on a processor or a computer.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the protection scope of the present application is defined by the appended claims.

For instance, it is understood that a disclosure in connection with a described method may also be applicable for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
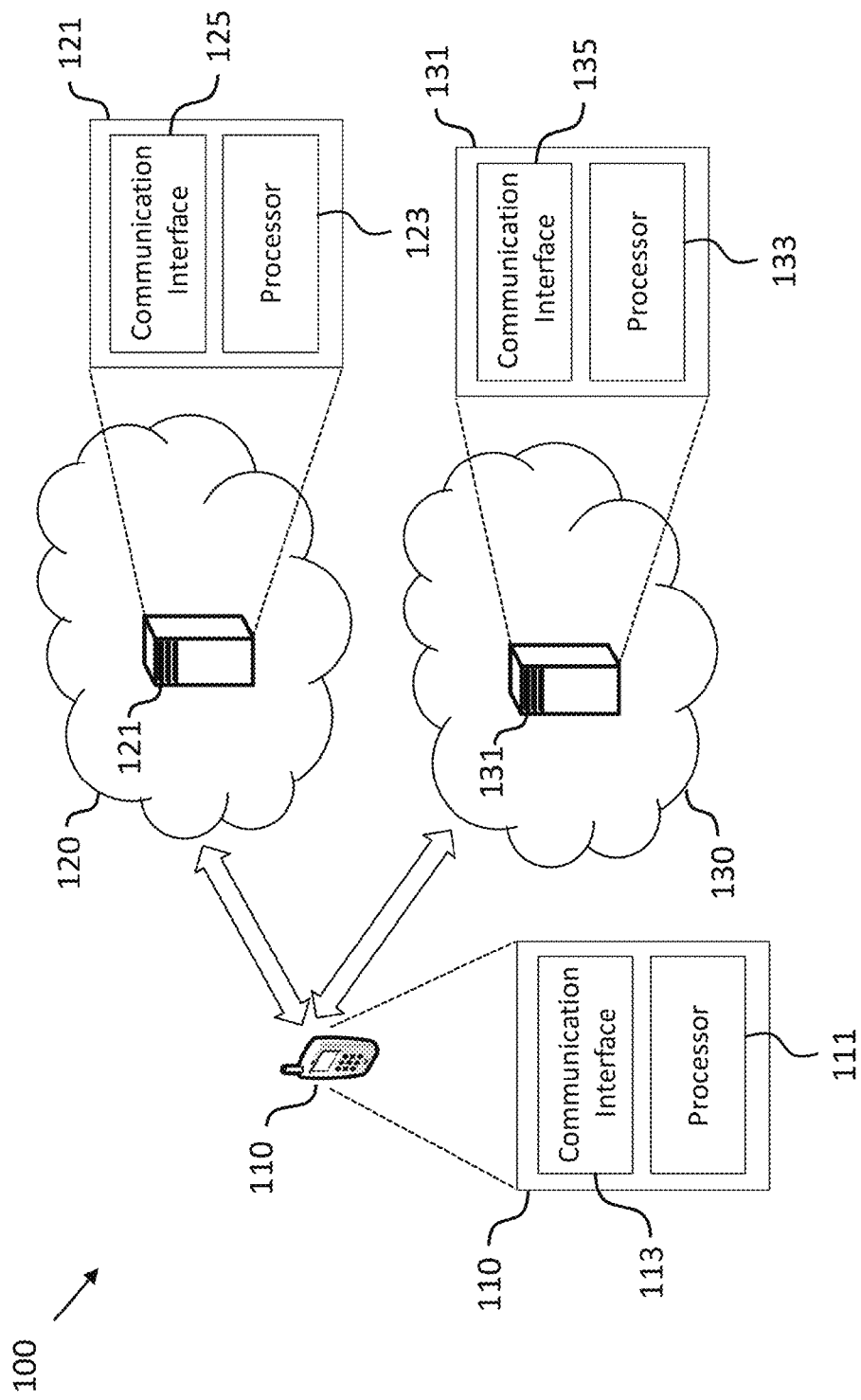
FIG. 1 shows a schematic diagram illustrating a wireless communication system comprising a user equipment according to an embodiment and a network entity according to an embodiment.

FIG. 1 shows a schematic diagram illustrating a wireless communication system 100 comprising a user equipment 110 according to an embodiment, which is configured to be connected to and communicate with a first mobile or cellular communication network 120 and a second mobile or cellular communication network 130. The first and second cellular communication networks 120, 130 can be physically or logically independent networks. For instance, the first and second cellular communication networks 120, 130 can be implemented on different network infrastructure operated by different network operators. Alternatively, the first and second cellular communication networks 120, 130 can be logically independent networks implemented on the same network infrastructure (also known as network slices). As shown in FIG. 1, respective network entities 121, 131, for instance, in the form of management servers, can be provided in the first and second cellular communication networks 120, 130, respectively.

Usually, when the UE 110 is registered to one of the cellular communication networks 120, 130, this does not necessarily mean that the UE 110 is able to communicate with other devices. To do this, according to current standards it must be in a usually called CONNECTED state, where network communication resources, in particular resource blocks, have been allocated to the UE 110. If no communication resources have been allocated to the UE 110, it is considered to be in a typically called IDLE state, where the UE 110 has to be triggered to request for communication resources.

Embodiments of the invention allow managing the states of the UE 110 through the proper processing of different events and the transition between these states. Embodiments of the invention enable the simultaneous communication of the UE 110 with the first and second cellular communication networks 120, 130 at the same time by means of control protocols being associated with one state machine in the UE 110 and independent control plane state machines in first and second cellular communication networks 120, 130 (or the corresponding network entities 121, 131 thereof). According to embodiments of the invention, the UE 110 can be in the IDLE state in a subset of cellular communication networks and CONNECTED in the rest of the cellular communication networks.

According to an embodiment, when the UE 110 is in the IDLE state, it can either execute typical actions as specified in the corresponding telecommunication standards (e.g., monitoring the frequency of broadcasting or paging channels) or it may adopt a different behavior (e.g., faster monitoring of the downlink channels) according to particular triggering events (e.g., entering a specific geographical area, network load notification, etc.).

According to an embodiment, when the UE 110 is CONNECTED to more than one of the cellular communication networks 120, 130, it is configured to provide these networks appropriate information. For instance, the UE 110 can be connected to the first cellular communication network 120 and communication resources have been allocated to the UE 110 by the first cellular communication network 120. If the UE 110 becomes CONNECTED to the second cellular communication network 130, while remaining CONNECTED to the first cellular communication network 120, according to an embodiment the UE 110 is configured to inform the second cellular communication network 130 about potential restrictions it will have for the allocation of communication resources. In other words, according to an embodiment the UE 110 is configured to provide the second cellular communication network 130 with information allowing the second cellular communication network 130 (or the network entity 131 thereof) not to allocate communication resources, for instance, during the same time interval in both networks 120, 130, since the UE 110 may have only one RF chain and cannot transmit data in different networks possibly operating in different spectrum bands, as will be described in more detail further below.

As can be taken from the detailed view of FIG. 1, the UE 110 comprises a processor 111 and a communication interface 113 for communicating with the first and second cellular communication networks 120, 130 (and the corresponding network entities 121, 131 thereof).

As will be described in more detail further below, the communication interface 113 is configured to transmit a first message to the second cellular communication network 130, when the user equipment 110 is connected to the first cellular communication network 120 and is triggered to connect additionally to the second cellular communication network 130, wherein the first message comprises information about the first cellular communication network 120.

In an embodiment, the communication interface 113 is configured to transmit a second message to the second cellular communication network 130, when the user equipment 110 is connected to the first cellular communication network 120 and the second cellular communication network 130, wherein the second message comprises information about the first cellular communication network 120.

In an embodiment, the first message and/or the second message further comprises information about the allocation of at least one of a plurality of communication resources, in particular time-frequency resource blocks, to the user equipment 110 by the first cellular communication network 120.

In an embodiment, the first message is a "Connection Request" message and the communication interface 113 is configured to transmit the "Connection Request" message to the second cellular communication network 130, when the user equipment 110 is triggered to connect additionally to the second cellular communication network 130.

In an embodiment, the processor 111 of the UE 110 is configured to be in one of a plurality of states, including a first state and a second state, wherein in the first state of the processor 111 the UE 110 is connected to the first cellular communication network 120 but not to the second cellular communication network 130 and wherein in the second state of the processor 111 the UE 110 is connected to the first cellular communication network 120 and the second cellular communication network 130.

As can be taken from the detailed view of FIG. 1, both the network entity 121 and the network entity 131 comprise a processor 123, 133 and a communication interface 125, 135. In the exemplary case that the UE 110 is already connected to the first cellular communication 120 the network entity 131 of the second cellular communication network 130 is configured to receive a message from the UE 110 via its communication interface 135, wherein the message comprises information about the first cellular communication network 120 the UE 110 is already connected to. The processor 133 of the network entity 131 is configured to allocate at least one of the plurality of communication resources to the UE 110 for communicating over the second cellular communication network 130 on the basis of the information about the first cellular communication network 120 the UE 110 is already connected to.

As already described above, embodiments of the invention allow managing the connections of the user equipment 110 with multiple mobile networks by having one higher layer radio control protocol which undertakes responsibilities similar to the ones that the Radio Resource Control protocol according to the current LTE standard undertakes. In particular, the radio control protocol provided by embodiments of the invention relates to connection management, downlink channels monitoring (such as Paging Channel in LTE), and resource control.

Figure 2:
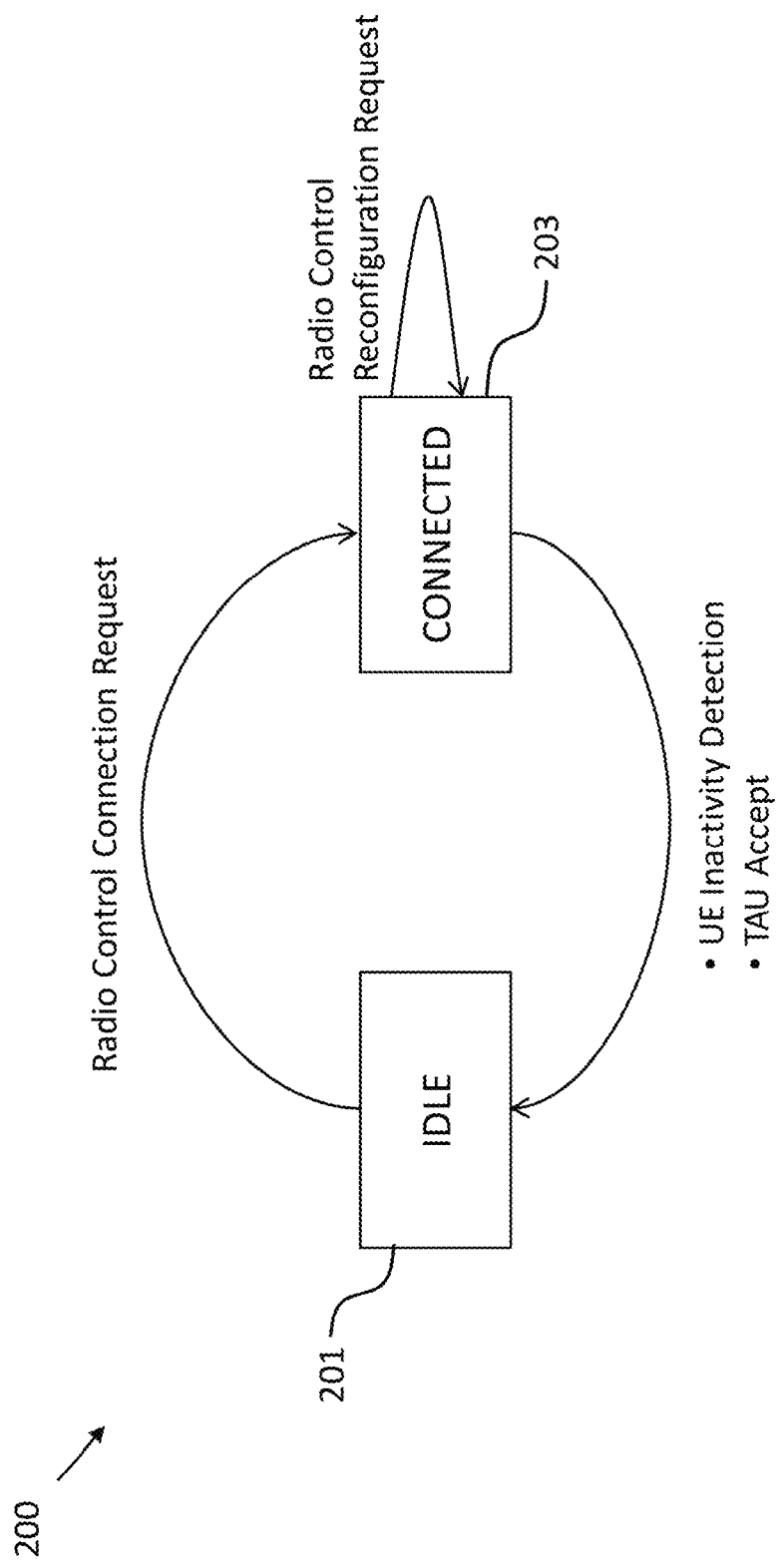
FIG. 2 shows a state diagram implemented in a network entity according to an embodiment.

FIG. 2 shows a state diagram of a state machine 200 implemented in the network entities 121, 131 according to an embodiment. When the network entity 121, 131 receives a Connection Request message from the UE 110 that is in the IDLE state (reference sign 201), the network entity 121, 131 processes this request and changes the status of the UE 110 to the CONNECTED state (reference sign 203). In an embodiment, the Connection Request message contains further information regarding the cellular networks that the UE 110 is already connected to and its restrictions for communication, such as information about timing restrictions, physical communication resources and the like. When being in the CONNECTED state, if the UE 110 is inactive for a certain amount of time or when a Tracking Area Update (TAU) Accept message, i.e. a message related to the UE Tracking Area List for mobility management purposes, is sent to the UE 110, it will turn to the IDLE state. Additionally, when the UE 110 is in the CONNECTED state, it may send a Reconfiguration Request to the network entity 121, 131 for several purposes, such as establishing/modifying/releasing radio bearers and/or performing a handover.

With respect to the UE 110, as already described above, embodiments of the invention provide an enhanced radio control protocol, which can be represented using various state machine diagrams (or short state diagrams). In the following three embodiments of a state machine implemented in the UE 110 will be described in more detail. In brief, the state machines of these functionally similar embodiments of the UE 110 can be characterized as follows.

In the first embodiment the UE 110 comprises a state machine, which is based on the state machine as defined by the LTE standard and further takes into account the number of cellular communication networks 120, 130 to which the UE 110 is connected to.

In the second embodiment the UE 110 comprises a state machine, which is based on the state machine as defined by the LTE standard and comprises a further state referred to as "MULTI-CONNECTED" state. In this "MULTI-CONNECTED" state the UE 110 is connected with more than one cellular communication network 120, 130. This embodiment also allows keeping track of the number of cellular communication networks 120, 130 to which the UE 110 is connected to.

In the third embodiment the UE 110 is configured to implement multiple instances of a state machine, which is based on the state machine as defined by the LTE standard. In this third embodiment the UE 110 can comprise a state machine selection function for defining which instance of the state machine will be used at each specific point in time.

Figure 3:
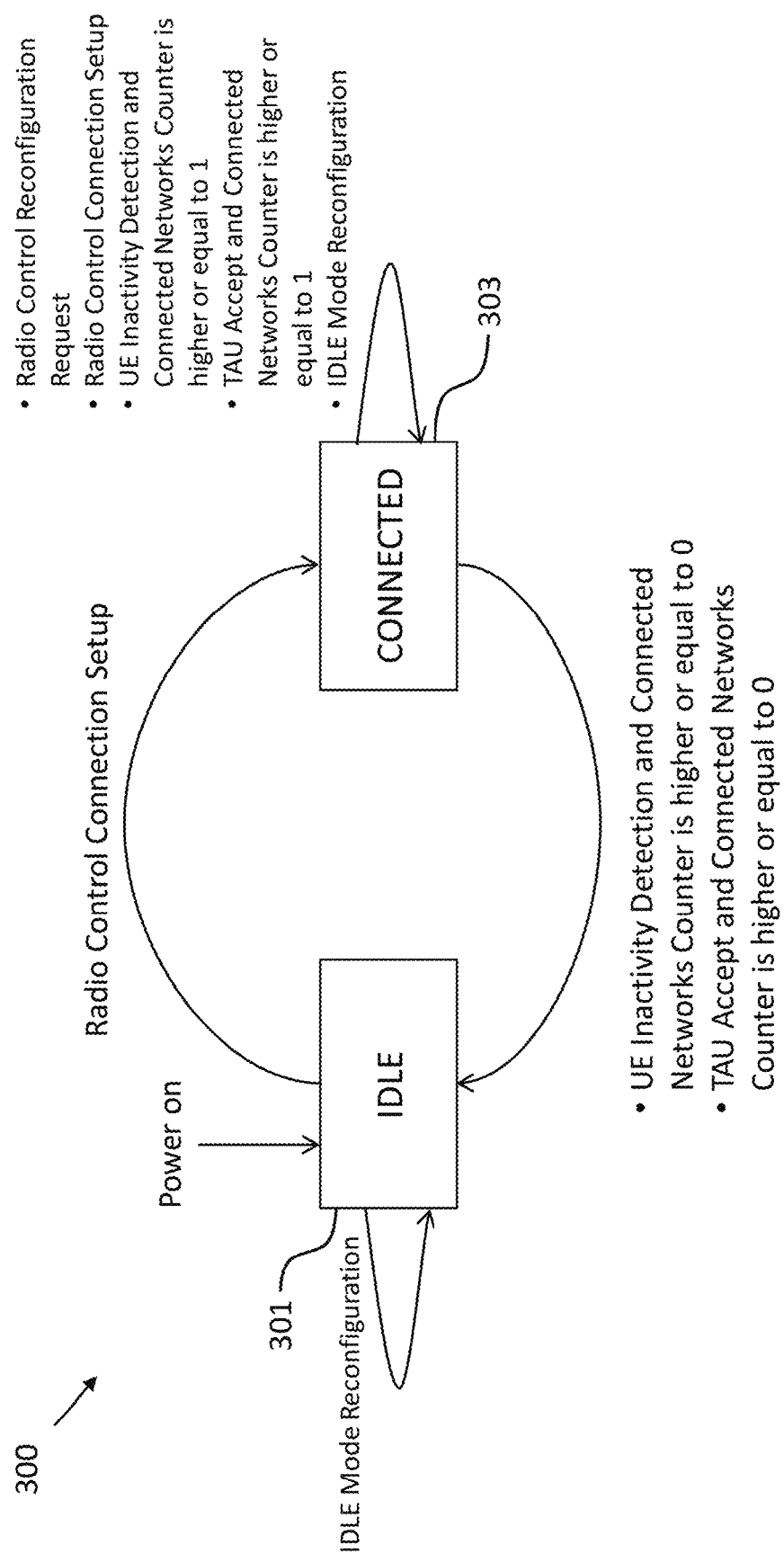
FIG. 3 shows a state diagram implemented in a user equipment according to an embodiment.

FIG. 3 shows a state diagram of the state machine 300 implemented in the UE 110 according to the first embodiment. As already mentioned above, in this first embodiment the state machine implemented in the UE 110 is based on the RRC state machine defined by the LTE standard in that it comprises the same states as the RRC state machine defined by the LTE standard, namely an IDLE state (reference sign 301) and a CONNECTED state (reference sign 303). Furthermore, the state machine 300 implemented in the UE 110 according to this first embodiment comprises a counter for tracking the number of cellular communication networks 120, 130 the UE 110 is connected (CONNECTED state) to or in an IDLE state relative thereto.

As illustrated in FIG. 3, once the UE 110 according to the first embodiment is powered on, it switches to the IDLE state with respect to all the mobile networks 120, 130. Then, on the basis of the UE's configuration (which may be fixed in a SIM card of the UE 110, periodically updated, or updated in every other way) the UE 110 will start registering itself to each of the individual mobile networks 120, 130. The registration may take place sequentially (i.e., the UE 110 registers itself to a new mobile network once a previous registration has finished) or simultaneously (the registration procedure can be initiated to all the networks at the same time), as far as this is possible due to potential limitations of the physical layer of the UE 110. For registering itself in one of the mobile networks 120, 130 the UE 110 has to switch to the CONNECTED state with respect to that mobile network. To this end, in an embodiment, the UE 110 is configured to send a "Connection Request" message, in particular a "Radio Control Connection Setup" message to the first mobile network to which it wants to register on the basis of the UE's configuration, for instance, the first mobile network 120. As a result thereof, the UE 110 will be CONNECTED with the first mobile network 120 and IDLE with respect to all the other mobile networks; the UE 110, thus, will be in the CONNECTED state. In order to register with the other mobile networks the UE 110 is configured to send further "Radio Control Connection Setup" messages to these mobile networks and it will remain in the CONNECTED state.

In an embodiment, the UE 110 comprises a counter for the number of mobile networks 120, 130 to which the UE 110 is already CONNECTED to (herein also referred to as "Connected Networks Counter"). This counter is configured to enable the UE 110 to decide whether to remain in the CONNECTED state or to switch to the IDLE state. For instance, in an embodiment, if the counter is larger than or equal to 1, the UE 110 remains in the CONNECTED state. Otherwise, i.e. if the counter is equal to 0, the UE 110 switches to the IDLE state. Such an embodiment will be further illustrated by means of the following exemplary scenario.

In an exemplary scenario the UE 110 can be CONNECTED to a mobile network A (e.g. the first mobile network 120 of FIG. 1) and in the IDLE state with respect to mobile networks B (e.g. the second mobile network 130 of FIG. 1) and C; the UE will be in the CONNECTED state in his local state diagram. Once the UE 110 wants to be CONNECTED to the mobile network B as well, it will send a "Connection Request" message, in particular a "Radio Control Connection Setup" message, to the mobile network B, while being in the CONNECTED state in its state machine. As a result thereof, the UE 110 will be CONNECTED to the mobile networks A and B and it will be IDLE with respect to the mobile network C in the respective network state diagrams. Moreover, the UE 110 will increment the Connected Networks Counter from 1 to 2. Once inactivity is detected with respect to one of the two connected mobile networks, by way of example with respect to mobile network B, the UE 110 will switch to the IDLE state relative to the mobile network B in the state diagram of the mobile network B, but it will remain in the CONNECTED state, since it is in the CONNECTED state for at least one network, namely the mobile network A. Accordingly, the UE 110 will decrement the Connected Networks Counter from 2 to 1. Once inactivity of the UE 110 is detected with respect to the mobile network A as well, the UE 110 will turn to IDLE for the mobile network A (i.e. the state diagram of mobile network A) as well. As correspondingly, the UE 110 will be IDLE for all mobile networks with the Connected Networks Counter having been decremented once more to 0, the UE 110 will turn to its IDLE state. In an embodiment, the same process can be followed for the reception of TAU Accept messages.

When the UE 110 is in the CONNECTED state, according to an embodiment it can send Radio Control Reconfiguration Messages to the mobile networks 120, 130 that the UE 110 is already connected to. These Radio Control Reconfiguration Messages can be used for establishing or modifying bearers or for performing handovers or any other similar procedures that are part of similar protocols such as the RRC in LTE and are captured by the RRC reconfiguration request process.

When the UE 110 is in the IDLE state with respect to one or more mobile networks 120, 130, according to an embodiment the way that it behaves is configurable in terms of which downlink channel it should monitor and how often (e.g., Paging Channel in LTE) for each of the mobile networks 120, 130. This configuration can depend on the capabilities of the UE 110 and is configurable by the network entities 121, 131 of the mobile networks 120, 130. As will be appreciated, if, for instance, the UE 110 has multiple RF chains, it has the capability to remain inactive during the switching from one mobile network to another. This can be the case, for instance, when two mobile networks 120, 130 operate with communication resources at different frequencies or having different waveforms. Thus, in an embodiment, the UE 110, when it is in IDLE state in the network state diagram, it may have a different configuration compared to other networks to which it is IDLE as well. In other words, the UE 110 can be IDLE with respect to more than one network and can have different configurations in the different networks. In an embodiment, the configuration of the UE 110 may be provided by a mobile network, when the UE 110 performs its initial registration or during other operations such as the Tracking Area Update (TAU) process. In other embodiments, such updates could be provided by means of periodic updates provided by the mobile networks or upon requests from the UE 110 or even can be preconfigured on a SIM card of the UE 110.

Figure 4:
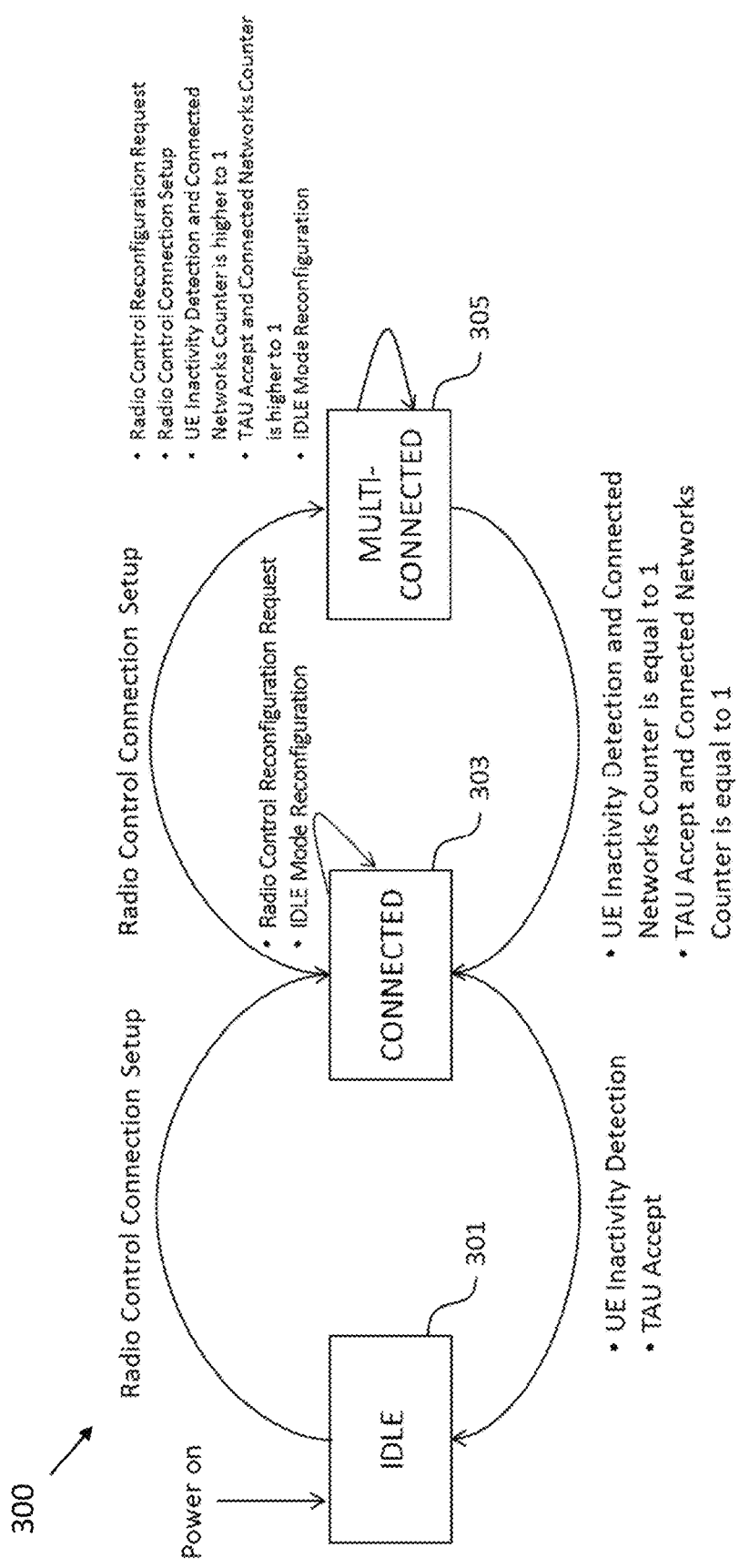
FIG. 4 shows a state diagram implemented in a user equipment according to an embodiment.

FIG. 4 shows a state diagram of the state machine 300 implemented in the UE 110 according to the second embodiment. As already mentioned above, in this second embodiment the state machine implemented in the UE 110 is based on the state machine as defined by the LTE standard and comprises a further state referred to as "MULTI-CONNECTED" state (reference sign 305). In this "MULTI-CONNECTED" state the UE 110 is connected with more than one mobile network 120, 130. This embodiment also allows keeping track of the number of mobile networks 120, 130 to which the UE 110 is connected to.

As illustrated in FIG. 4, the mobile network 120, 130 may still update the IDLE mode operation of the UE 110. For this embodiment the Connected Networks Counter provides the information about when the UE 110 should be in the MULTI-CONNECTED state or in the CONNECTED state.

Figure 5:
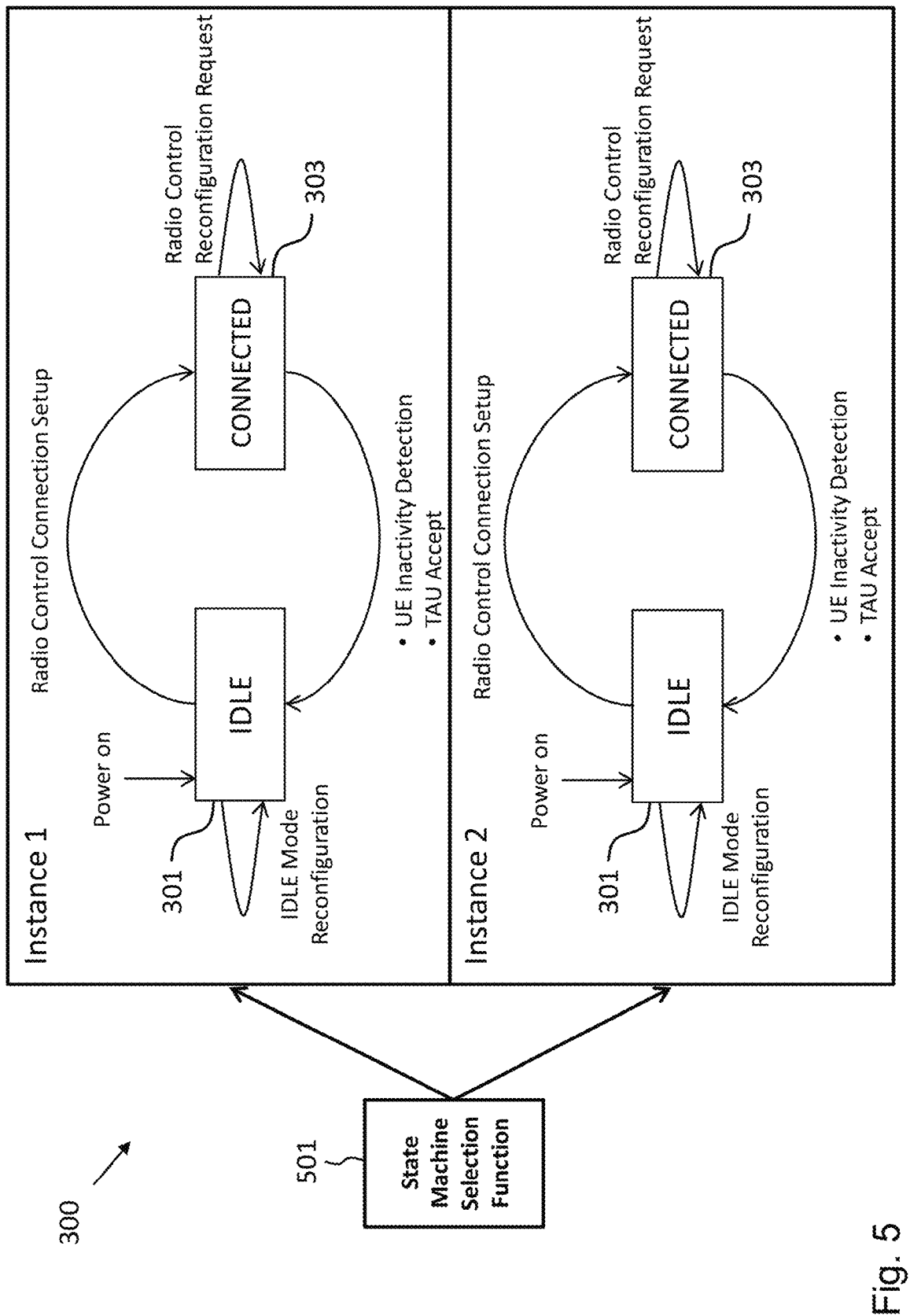
FIG. 5 shows a state diagram implemented in a user equipment according to an embodiment.

FIG. 5 shows a state diagram of the state machine 300 implemented in the UE 110 according to the third embodiment. As already mentioned above, in this third embodiment the UE 110 is configured to implement multiple instances of a state machine, which is based on the state machine as defined by the LTE standard. In the embodiment illustrated in FIG. 5 the UE 110 comprises a state machine selection function 501 for defining which instance of the state machine will be used at each specific point in time.

Figure 6:
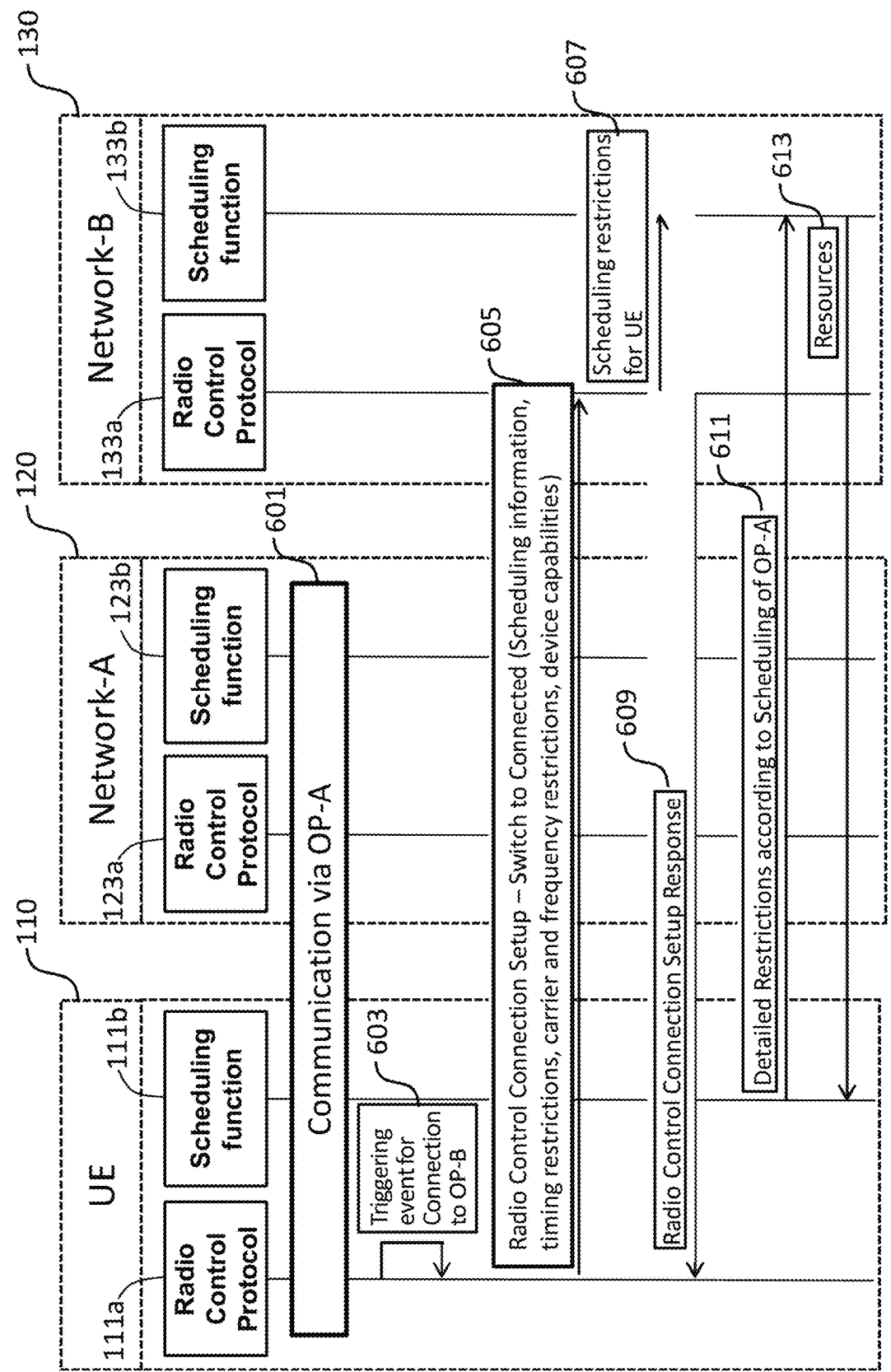
FIG. 6 shows a schematic diagram illustrating interactions between a user equipment according to an embodiment and a network entity according to an embodiment.

FIG. 6 shows a schematic diagram illustrating multiple interactions between the UE 110 according to an embodiment and the cellular communication networks 120, 130 as well as their network entities 121, 131. In the embodiment shown in FIG. 6, a radio control protocol 111a and a scheduling function 111b are implemented on the processor 111 of the UE 110. Likewise, corresponding radio control protocols 123a, 133a and scheduling functions 123b, 133b are implemented on the processor 123, 133 of the network entity 121, 131 of the first and second cellular communication networks 120, 130, respectively.

In an embodiment, when the UE 110 wants to connect with multiple mobile networks 120, 130 at the same time, it is configured to provide to each individual mobile network 120, 130 information about its capabilities and/or restrictions regarding its wireless connections. In an embodiment, this information can include the availability of multiple RF chains in the UE 110, possible waveforms, other active connections, or any other type of restrictions including timing restrictions, band restrictions, energy saving requirements for multiple connections, etc. This information can be used by the scheduling function 123b, 133b of each mobile network 120, 130 for avoiding overlaps in the scheduling (Uplink, Downlink, Sidelink) of the UE 110. These overlaps may refer to frequency bands (if common spectrum is used), or time overlaps (if the UE 110 uses one RF chain it will not be possible to access both networks simultaneously), codes (if certain Code Division Multiple Access (CDMA) schemes are used). According to an embodiment, this information can be provided in the Radio Control Protocol Connection Setup Messages and Radio Control Protocol Reconfiguration Requests that the UE 110 sends to the mobile networks 120, 130.

In an embodiment, more detailed information may be provided in the case of dynamic scheduling, where the UE 110 is configured to provide with high granularity information regarding its capabilities and/or restrictions (e.g., timing restrictions, occupied or already scheduled transmission time intervals (TTIs), etc.). The detailed restrictions can be provided in the Status Reporting of the UE 110 to each scheduling function 123b, 133b of each mobile network 120, 130 along with, for instance, a channel status, a buffer status and/or power headroom reports.

FIG. 6 illustrates both cases, where the UE 100 provides generic restrictions in the Radio Control Connection Setup message (i.e., restrictions related to scheduling information, timing restrictions, carrier and frequency restrictions, device capabilities; provided with the message in block 605 of FIG. 6) and more detailed restrictions (e.g., timing restrictions; provided with the message in block 611 of FIG. 6) via direct interactions with the scheduling function 133b of the new network to which it wants to connect, i.e. the second mobile network 130. In an embodiment, this detailed information can be provided by the scheduling function 111b of the UE 110, which can be configured to provide this information to the other mobile network to which the UE is already connected as well, namely mobile network 120. In the embodiment shown in FIG. 6, the processor 111 of the UE 110 implements the radio control protocol 111a and the scheduling function 111b. Likewise, the respective processors 123, 133 of the respective network entities 121, 131 of the first and second mobile networks 120, 130 implement a respective radio control protocol 123a, 133a and a respective scheduling function 123b, 133b. In addition to the steps already described above FIG. 6 shows the following steps: a step 601 of communication between the UE 110 and the first mobile network 120; a step 603 of triggering a connection to the second mobile network 130; a step 607 of forwarding the scheduling restrictions received in step 605 to the scheduling function 133b of the network entity 131 of the second mobile network 130; a step 609 of sending a Radio Control Connection Setup Response from the radio control protocol 133a of the network entity 131 of the second mobile network 130 to the UE 110; and a step 613 of allocating communication resources by the scheduling function 133b of the network entity 131 of the second mobile network 130 to the UE 110.

Another embodiment of the invention relates to the timings of the mobile networks 120, 130. As the mobile networks 120, 130 generally might not be synchronized, in an embodiment the UE 110 is configured to synchronize with each mobile network 120, 130 for transmission and reception. To this end, in an embodiment the UE 110 comprises a timing function configured to provide a temporal alignment or coordination among the multiple networks 120, 130. This timing function allows the UE 110 to synchronize faster with the other network or to achieve energy gains by avoiding having to listen to the synchronization channels all the time. In an embodiment, the functionalities of the timing function of the UE 110 include time shifting for being able to synchronize to a new transmission/reception, and even more complicated actions including sleeping and waking up for certain time periods.

The triggering events for the transition among the states of the Radio Control Protocol implemented by embodiments of the invention can include: new incoming or outgoing data traffic; UE Inactivity; activation, sensing, notification and/or identification of a new mobile network; entering/leaving special geographical areas; reception of certain messages for reconfiguration of the operation of the UE 110 and/or reception of certain messages related to the location tracking of the UE 110.

Figure 7:
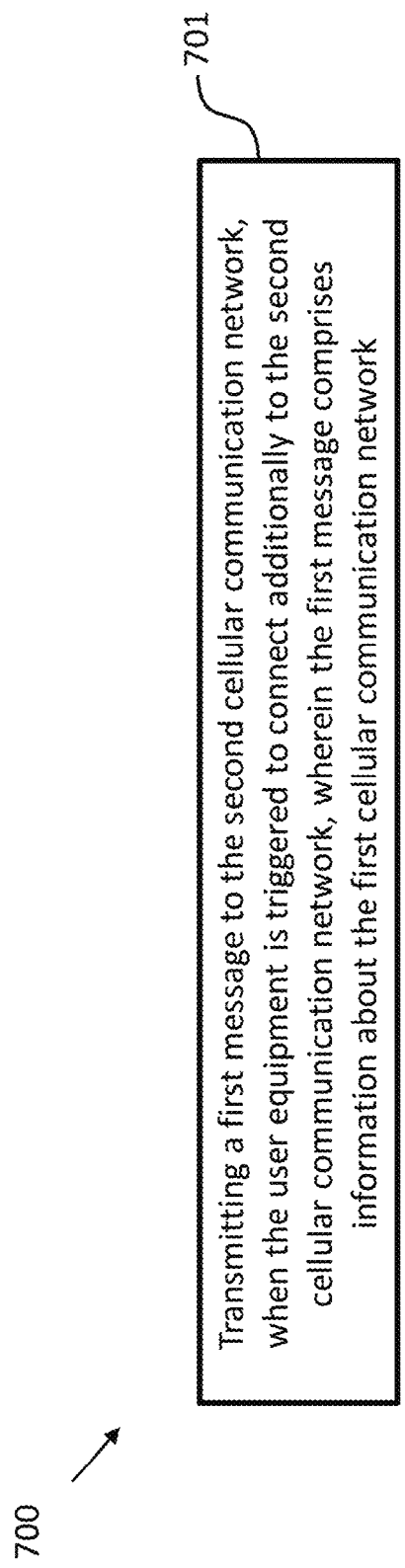
FIG. 7 shows a schematic diagram illustrating a method of operating a user equipment according to an embodiment.

FIG. 7 shows a schematic diagram illustrating a method 700 of operating the user equipment 110 according to an embodiment. The method 700 comprises the step 701 of transmitting a first message to the second cellular communication network 130, when the user equipment 110 is triggered to connect additionally to the second cellular communication network 130, wherein the first message comprises information about the first cellular communication network 120.

Figure 8:
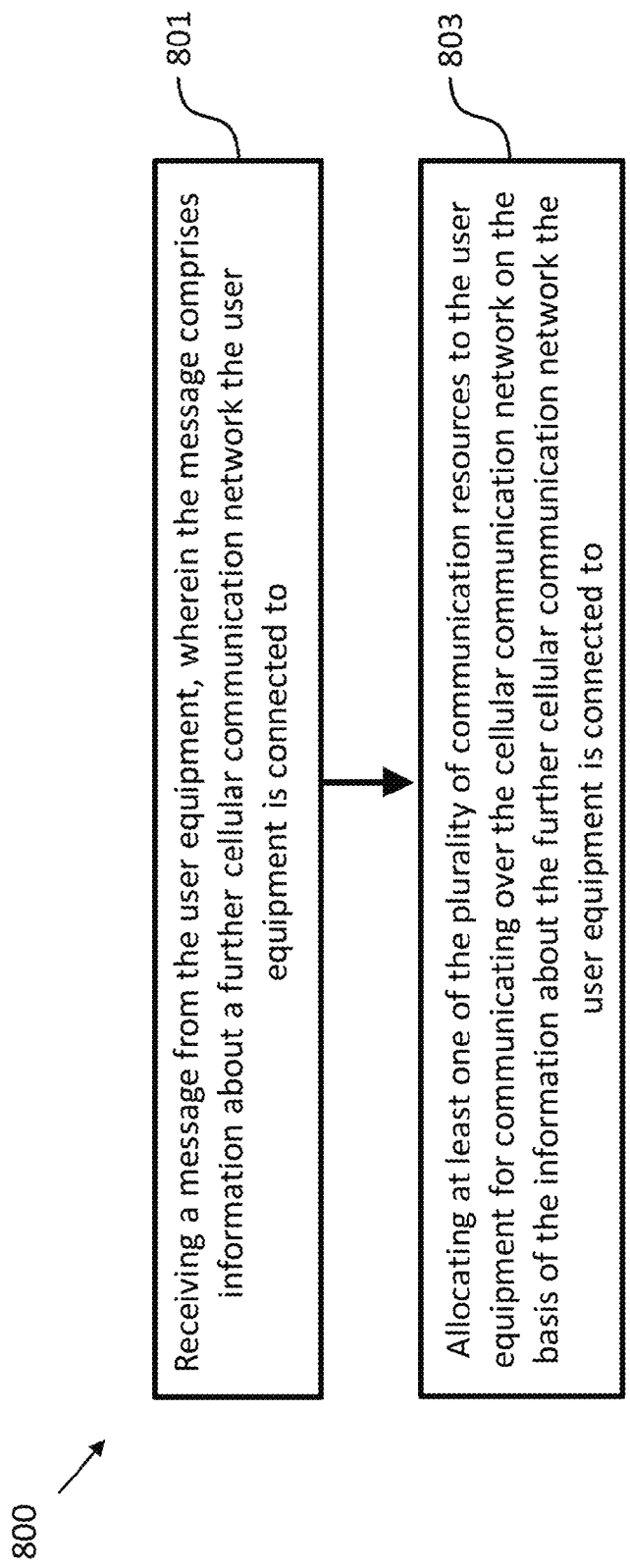
FIG. 8 shows a schematic diagram illustrating a method of operating a network entity according to an embodiment.

FIG. 8 shows a schematic diagram illustrating a method 800 of operating the network entity 131 according to an embodiment. The method 800 comprises the steps of: receiving a message from the user equipment 110, wherein the message comprises information about the further cellular communication network 120 the user equipment is connected to; and allocating at least one of the plurality of communication resources to the user equipment 110 for communicating over the cellular communication network 130 on the basis of the information about the further cellular communication network 120 the user equipment 110 is connected to.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

Additionally, statements made herein characterizing the invention refer to an embodiment of the invention and not necessarily all embodiments.

What is claimed is:

1. A user equipment, comprising:
   a processor configured to determine, in response to detecting a second communication network or a change of a geographical position of the user equipment, that the user equipment is to connect to the second communication network in addition to a first communication network to which the user equipment is currently connected; and
   a communication interface configured to transmit, in response to the determination that the user equipment is to additionally connect to the second communication network, a first message to the second communication network while the user equipment is connected to the first communication network, wherein the first message comprises timing restrictions and/or carrier and frequency restrictions for communication between the user equipment and the second communication network to inform the second communication network regarding the timing restrictions and/or carrier and frequency restrictions for communication between the user equipment and the second communication network;
   wherein the user equipment is further configured to establish, after transmission of the first message, the additional connection to the second communication network while the user equipment is connected to the first communication network, wherein the additional connection to the second communication network is subject to the timing restrictions and/or carrier and frequency restrictions in the first message;
   wherein the processor is further configured to manage a plurality of states of the user equipment, including a first state and a second state, wherein in the first state the user equipment is connected to the first communication network but not to the second communication network, and wherein in the second state the user equipment is connected to both the first communication network and the second communication network; and
   wherein the communication interface is configured to transmit a second message intermittently to the second communication network while the user equipment is connected to both the first communication network and the second communication network, wherein the second message comprises one or more additional restrictions for communication between the user equipment and the second communication network.

2. The user equipment of claim 1, wherein the first message comprises information about an allocation of at least one of a plurality of communication resources to the user equipment by the first communication network.

3. The user equipment of claim 1, wherein the first message is a connection request message.

4. The user equipment of claim 1, wherein the processor is further configured to provide a counter corresponding to the number of communication networks the user equipment is connected to, wherein the first state is a connected state with a first value of the counter, and the second state is a connected state with a second value of the counter.

5. The user equipment of claim 1, wherein the first state is a connected state and the second state is a multi-connected state.

6. The user equipment of claim 1, wherein the processor is configured to implement a plurality of instances of a state diagram, wherein the first state of the user equipment corresponds to a connected state of a single instance of the state diagram, and wherein the second state of the user equipment corresponds to connected states of two instances of the state diagram.

7. The user equipment of claim 1, wherein the processor is further configured to temporally align communications with the first and the second communication networks in the second state.

8. The user equipment of claim 1, wherein the user equipment is configured to access a broadcast channel of the first communication network for connection to the first communication network and to access a broadcast channel of the second communication network for connection to the second communication network.

9. A method, comprising:
   determining, by a user equipment in response to detecting a second communication network or a change of a geographical position of the user equipment, that the user equipment is to connect to the second communication network in addition to a first communication network to which the user equipment is currently connected;
   transmitting, by the user equipment in response to the determination that the user equipment is to additionally connect to the second communication network, a first message to the second communication network while the user equipment is connected to the first communication network, wherein the first message comprises timing restrictions and/or carrier and frequency restrictions for communication between the user equipment and the second communication network to inform the second communication network regarding the timing restrictions and/or carrier and frequency restrictions for communication between the user equipment and the second communication network; and
   establishing, by the user equipment, after transmission of the first message, the additional connection to the second communication network while the user equipment is connected to the first communication network, wherein the additional connection to the second communication network is subject to the timing restrictions and/or carrier and frequency restrictions in the first message;

wherein the user equipment manages a plurality of states of the user equipment, including a first state and a second state, wherein in the first state the user equipment is connected to the first communication network but not to the second communication network, and wherein in the second state the user equipment is connected to both the first communication network and the second communication network; and wherein the communication interface is configured to transmit a second message intermittently to the second communication network while the user equipment is connected to both the first communication network and the second communication network, wherein the second message comprises one or more additional restrictions for communication between the user equipment and the second communication network.

10. A network entity of a second communication network, comprising:
a communication interface configured to receive a message from a user equipment, wherein the message comprises timing restrictions and/or carrier and frequency restrictions for communication between the user equipment and the second communication network due to an existing connection between the user equipment and a first communication network; and
a processor configured to allocate at least one of a plurality of communication resources to the user equipment for communicating over the second communication network based on the timing restrictions and/or carrier and frequency restrictions in the message;

wherein the network entity is further configured to establish, based on the allocation of the at least one of the plurality of communication resources, a connection to the user equipment, wherein the connection to the user equipment is subject to the timing restrictions and/or carrier and frequency restrictions in the message;

wherein the user equipment is configured to manage a plurality of states of the user equipment, including a first state and a second state, wherein in the first state the user equipment is connected to the first communication network but not to the second communication network, and wherein in the second state the user equipment is connected to both the first communication network and the second communication network; and wherein the communication interface is configured to receive a second message intermittently from the user equipment while the user equipment is connected to both the first communication network and the second communication network, wherein the second message comprises one or more additional restrictions for communication between the user equipment and the second communication network.

11. The network entity of claim 10, wherein the message further comprises an allocation of the at least one of the plurality of communication resources to the user equipment by the first communication network.

12. The network entity of claim 10, wherein the message is a connection request message.

13. The network entity of claim 10, wherein the processor is configured to dynamically allocate the at least one of the plurality of communication resources to the user equipment for communicating over the second communication network, in response to receiving the message from the user equipment.

14. A method, comprising:
receiving, by a network entity of a second communication network, a message from a user equipment, wherein the message comprises timing restrictions and/or carrier and frequency restrictions for communication between the user equipment and the second communication network due to an existing connection between the user equipment and a first communication network;
allocating, by the network entity, at least one of a plurality of communication resources to the user equipment for communicating over the second communication network based on the timing restrictions and/or carrier and frequency restrictions in the message; and
establishing, by the network entity, based on the allocation of the at least one of the plurality of communication resources, a connection to the user equipment, wherein the connection to the user equipment is subject to the timing restrictions and/or carrier and frequency restrictions in the message;
wherein the user equipment is configured to manage a plurality of states of the user equipment, including a first state and a second state, wherein in the first state the user equipment is connected to the first communication network but not to the second communication network, and wherein in the second state the user equipment is connected to both the first communication network and the second communication network; and
wherein the network entity receives a second message intermittently from the user equipment while the user equipment is connected to both the first communication network and the second communication network, wherein the second message comprises one or more additional restrictions for communication between the user equipment and the second communication network.

* * * * *